(12) United States Patent
Robins

(10) Patent No.: US 7,047,160 B2
(45) Date of Patent: May 16, 2006

(54) SYSTEM AND METHOD FOR DETERMINING MAINTENANCE NEEDS OF COMPLEX ELECTROMECHANICAL SYSTEMS

(75) Inventor: David R. Robins, Newton, MA (US)

(73) Assignee: Polaroid Corporation, Waltham, MA (US)

( * ) Notice: Subject to any disclaimer, the term of this patent is extended or adjusted under 35 U.S.C. 154(b) by 0 days.

(21) Appl. No.: 10/864,048

(22) Filed: Jun. 9, 2004

(65) Prior Publication Data

US 2005/0288900 A1  Dec. 29, 2005

(51) Int. Cl.
*G01F 11/30* (2006.01)
*G01F 15/00* (2006.01)
*G21C 17/00* (2006.01)

(52) U.S. Cl. ............... 702/184; 702/182; 702/183; 340/506; 340/521; 318/432; 318/433; 318/434

(58) Field of Classification Search ........ 702/182–184; 318/432–434; 340/521, 506
See application file for complete search history.

(56) References Cited

U.S. PATENT DOCUMENTS

| | | | | |
|---|---|---|---|---|
| 6,583,720 | B1* | 6/2003 | Quigley | 340/521 |
| 6,846,121 | B1* | 1/2005 | Bouverie et al. | 400/693 |
| 6,864,654 | B1* | 3/2005 | Letor et al. | 318/434 |
| 2004/0148320 | A1* | 7/2004 | Zabarski et al. | 708/207 |

* cited by examiner

Primary Examiner—John Barlow
Assistant Examiner—Sujoy Kundu

(57) ABSTRACT

A system and method for monitoring performance of an electromechanical system include monitoring a plurality of predetermined system conditions, collecting monitored values of the plurality of predetermined system conditions over time, and calculating system maintenance needs from collected monitored values.

28 Claims, 6 Drawing Sheets

SYSTEM AND METHOD FOR DETERMINING MAINTENANCE NEEDS OF COMPLEX ELECTROMECHANICAL SYSTEMS

FIELD OF THE INVENTION

The present invention generally relates to automated controls for electromechanical systems, and in particular to determining maintenance needs for such systems as a part of the automated control function.

BACKGROUND OF THE INVENTION

Automated computerized control systems for complex electromechanical systems are well known and widely used. Such control systems are highly advanced in their ability to maintain very close control over complex systems through the use constantly monitored sensors and closely controlled active inputs. Due however to the mechanical nature of such systems, periodic maintenance is still required to keep the mechanical performance of the systems within controllable limits and thereby avoid system malfunctions due to critical errors. This need for periodic maintenance is even more significant for remotely located or unattended systems, to avoid the consequences of a prolonged shut-down due to a critical error.

It is therefore desirable to have a system or method for monitoring the performance of complex electromechanical systems and determining the maintenance needs thereof in the absence of critical errors, thereby avoiding the uncertainty of predicting maintenance needs based upon system history.

SUMMARY OF THE INVENTION

Accordingly, one embodiment of the present invention provides a method for determining maintenance needs of an electromechanical system, comprising the steps of monitoring a plurality of predetermined system conditions, collecting monitored values of the plurality of predetermined system conditions over time, and calculating system maintenance needs from collected monitored values.

The step of collecting may include recording a separate monitored value representing each monitored system condition along with a time of occurrence for each monitored value. The step of calculating may include the steps of summing predetermined recorded values and comparing a resulting sum against a threshold value to determine system maintenance needs. The step of summing may use recorded values in accordance with their respective time of occurrence. The step of summing may include weighting the recorded values in accordance with their respective system condition. The step of comparing may include weighting either the resulting sum or the threshold value in accordance with the respective time of occurrence. The recorded values having a more recent time of occurrence may be given a higher weight than recorded values having a less recent time of occurrence.

The step of summing may alternatively use recorded values in accordance with their respective system conditions. The step of summing may include weighting the recorded values in accordance with their respective time of occurrence. The step of comparing may include weighting either the resulting sum or the threshold value in accordance with the respective system conditions.

The step of summing may use predetermined recorded values which indicate an error in their respective monitored system condition.

The step of calculating may use recorded values from a predetermined amount of most recent operation of the electromechanical system. The step of calculating may divide the predetermined amount of most recent operation into sequential segments and weight recorded values from more recent segments higher than recorded values from less recent segments. The step of calculating may substantially exclude periods of inactivity of the electromechanical system from the predetermined amount of most recent operation.

Another embodiment of the present invention provides a system for determining maintenance needs of an electromechanical system having a plurality of monitored system conditions, comprising a recording apparatus adapted for collecting and recording over time, monitored values from the plurality of monitored system conditions along with a time of occurrence for each recorded value, and a calculating system adapted for using recorded values along with their respective times of occurrence for calculating system maintenance needs. The calculating system may include an adder adapted for summing predetermined recorded values, and a comparator adapted for comparing a resulting sum from the adder against a threshold value to determine system maintenance needs. The predetermined recorded values may be selected in accordance with their respective times of occurrence, and the resulting sum or the threshold value may be weighted in accordance with the respective time of occurrence. The system may further comprise a multiplier adapted for weighting the predetermined recorded values in accordance with their respective system conditions prior to summing by the adder. The electromechanical system may be a printing apparatus.

Yet another embodiment of the present invention provides a system for determining system maintenance needs of an electromechanical system having a plurality of monitored system conditions, comprising a recording process adapted for collecting and recording over time, monitored values from the plurality of monitored conditions along with a time of occurrence for each recorded value, and a calculating process adapted for using recorded values and their respective times of occurrence for calculating maintenance needs.

The calculating process may include an adder process adapted for summing selected recorded values, and a comparator process adapted for comparing a resulting sum from the adder process against a threshold value to determine system maintenance needs. The predetermined recorded values may be selected in accordance with their respective times of occurrence, and the resulting sum or the threshold value may be weighted in accordance with the respective time of occurrence. The system may further comprise a multiplier process adapted for weighting the predetermined recorded values in accordance with their respective system conditions prior to summing by the adder process.

The predetermined recorded values may alternatively be selected in accordance with their respective monitored system conditions, and the resulting sum or the threshold value may be weighted in accordance with the respective monitored system conditions. The system may further comprise a multiplier process adapted for weighting the predetermined recorded values in accordance with their respective time of occurrence prior to summing by the adder process.

The calculating process may be adapted for using recorded values which indicate an error with their respective monitored system conditions.

The calculating process may be adapted to use recorded values from a predetermined amount of most recent operation of the electromechanical system. The calculating process may divide the predetermined amount of most recent operation into sequential segments and may weight recorded values from more recent segments higher than recorded values from less recent segments. The calculating process may substantially exclude periods of inactivity of the electromechanical system from the predetermined amount of most recent operation.

BRIEF DESCRIPTION OF THE DRAWINGS

The present invention is illustratively shown and described in reference to the accompanying drawings, in which.

DETAILED DESCRIPTION OF THE DRAWINGS

Figure 1:
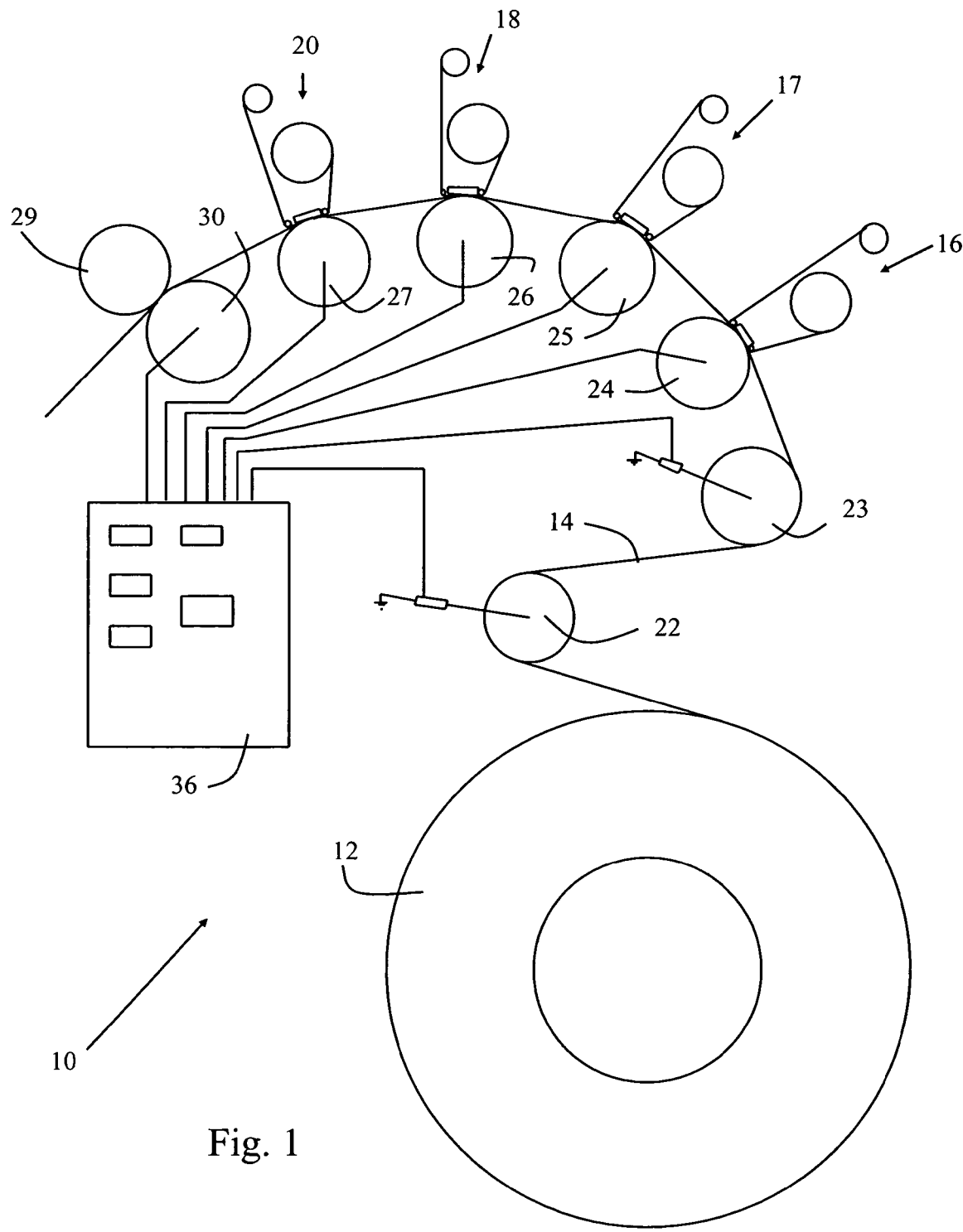
FIG. 1 is a representational diagram of a complex electromechanical apparatus.
Figure 2:
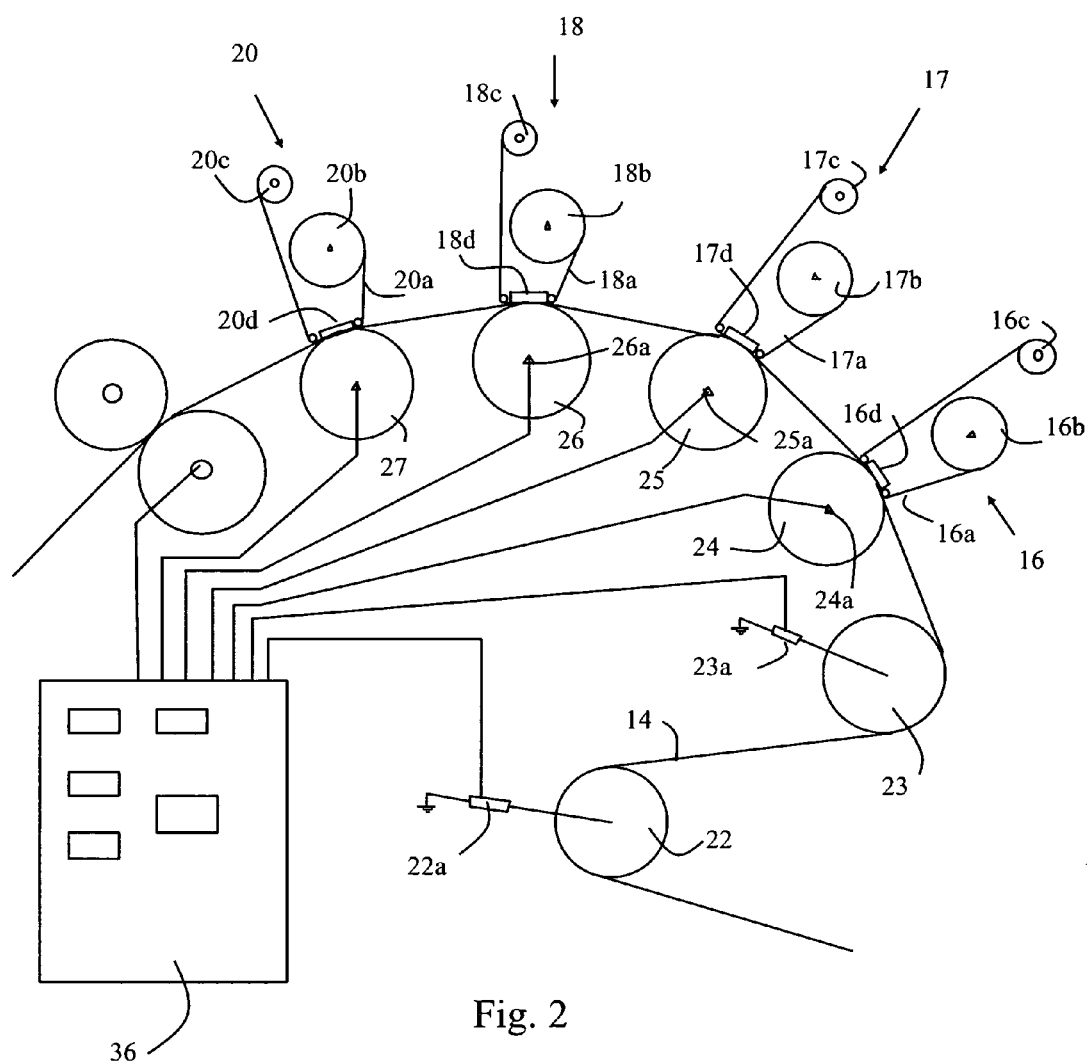
FIG. 2 is a close-up view of a portion of the diagram of FIG. 1.
Figure 3:
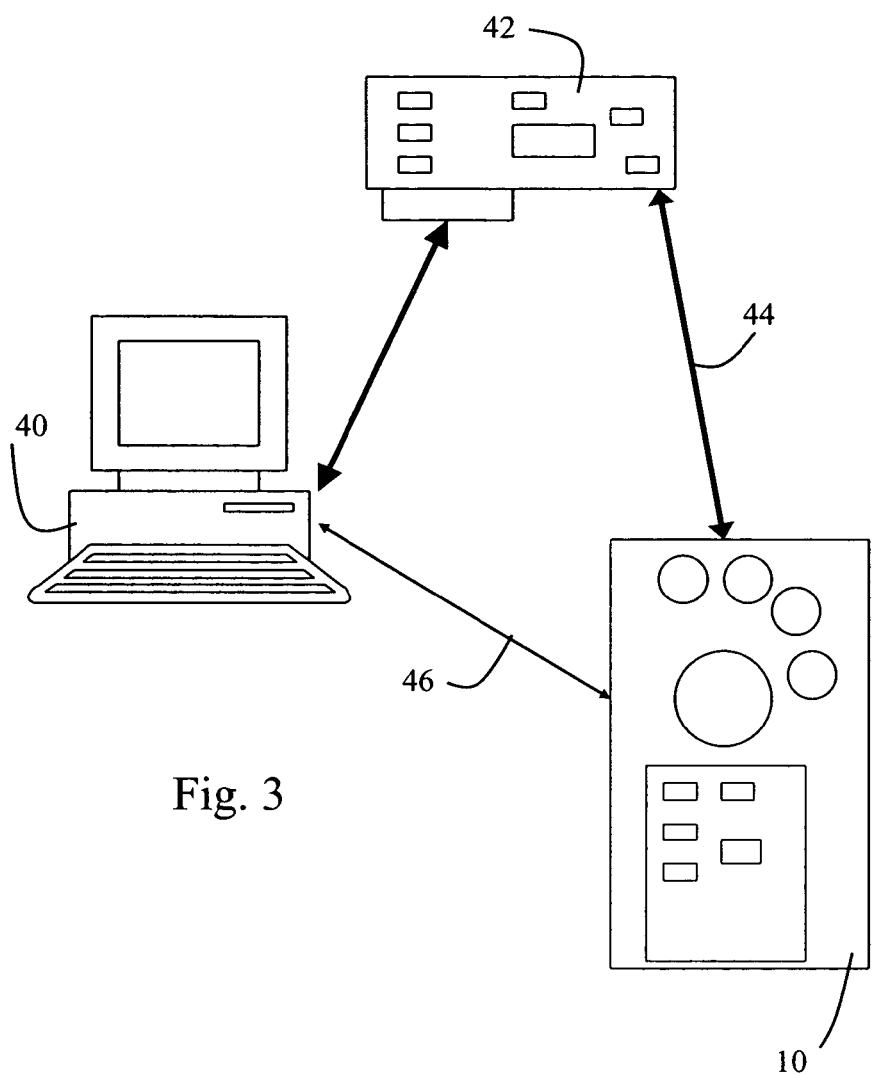
FIG. 3 is an overall system diagram of a printing apparatus including the apparatus of FIGS. 1 and 2.

The present invention is described in relation to a multi-color printer apparatus shown in FIGS. 1–3. FIG. 1 shows a representational side view of a complex electromechanical apparatus in the form of a multi-color printer apparatus 10, in which the present invention is used to monitor performance quality and to determine system maintenance needs prior to the occurrence of critical errors. Printer apparatus 10 provides a full spectrum of colors through the use of three separately applied color components and generally includes a supply roll 12 of print media 14, a multiplicity of separate color printing devices 16, 17, 18 and a clear coat device 20. Print media 14 is pulled from supply roll 12 and past printing devices 16, 17, 18 over a multiplicity of idler rollers 22, 23, 24, 25, 26, 27 by a pair of driven friction rollers 29, 30.

FIG. 2 is an enlarged view of the upper portion of apparatus 10, showing printing devices 16, 17, 18 and clear coat device 20. Each of the color components and the clear coat is applied to media 14 from a respective donor substrate or film 16a, 17a, 18a, 20a, which is supplied from a respective feed roll 16b, 17b, 18b, 20b and pulled by a respective, driven take-up roll 16c, 17c, 18c, 20c. The transfer of all of the color components and the clear coat is accomplished by heating the respective donor film with a respective print head 16d, 17d, 18d, 20d.

The complexity of apparatus 10 can be appreciated by the fact that the proper application of color components, including the proper alignment and balance of separately applied color components at the same image point, is readily affected by a variety of conditions including print media tension, the tension of donor films 16a, 17a, 18a, the temperature of print heads 16d, 17d, 18d, and even the ambient temperature and humidity of apparatus 10. For this reason, various sensors are located throughout apparatus 10 to monitor these predetermined system conditions.

Tension is typically measured by sensors and controlled through stepper motors. Tension on the print media and donor films may be measured by any suitable method. One approach is to mount the axels of each of the idler rollers 22–27 with respective pressure sensors 24a, 25a, 26a, 27a. Alternatively, idler rollers 22 and/or 23 may be mounted with a pair of bias mechanisms 22a, 23a, to maintain the proper tension on print media 12 within movement limits. Position sensors within bias mechanisms 22a, 23a may be used to make sure the bias mechanism remains within working limits. The tension of donor films 16a, 17a, 18a, 20a may similarly be monitored by any type of suitable sensor. Likewise, the temperature of print heads 16d, 17d, 18d, 20d, along with ambient temperature and humidity may be monitored by any suitable type of known sensor.

Apparatus 10 may further include an active computerized control system 36, which is responsive to the above-mentioned sensors and which controls different stepper drive motors and/or print head heater current, as a means of maintaining active control over the potential variables. Control system 36 is typically a dedicated system suitable for near instantaneous response to sensed system conditions and thereby capable of the greatest degree of control over performance of apparatus 10. Such control functions are known, and any suitable arrangement may be used for control system 36.

FIG. 3 shows apparatus 10 connected for use with a printer control computer 40, wherein image data is processed for printing on a dedicated image processing board 42 located within computer 40. The processing of image data for the separate print heads generally involves separating the color component values of each image pixel and creating the proper timing differences between the separate component values to ensure the precise alignment on print media 14 of the separate color components for each pixel. The processed data is then coupled to apparatus 10 via a broad band image data connection 44. Control signals are also coupled between apparatus 10 and control computer 40 via a control link 46. Although computer 40 is shown to have a monitor 48 and a keyboard 50, a simple server may also be used without monitor 48 or keyboard 50.

The present invention is now described with functional reference to the above apparatus 10. The present invention generally provides a monitoring function for determining maintenance requirements for an electromechanical system, which monitoring function operates in addition to all of the known control functions typically used in combination with such a system. The present invention monitors a plurality of predetermined system conditions and collects the monitored values over time. The present invention then reviews the collected values to determine maintenance needs for the monitored system. Whereas known control functions can be used to halt operation of an apparatus in the event of a critical error, the present application describes a system and method which measure the quality of performance of an apparatus to more accurately determine maintenance needs in the absence of critical errors.

Figure 4:
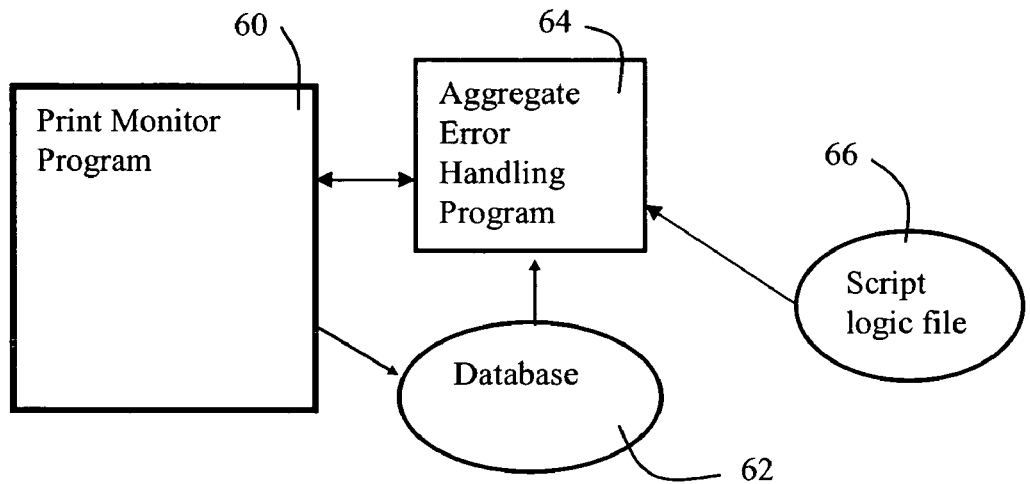
FIG. 4 is a representational view of software created in accordance with one embodiment of the present invention.
Figure 5:
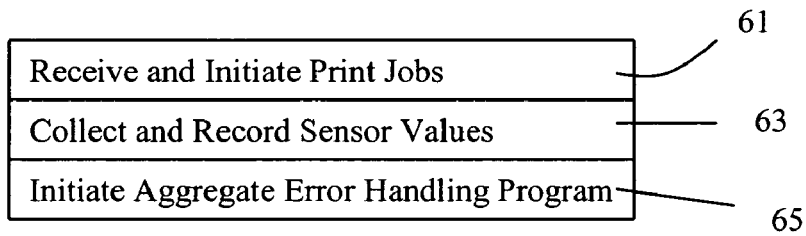
FIG. 5 is a table-format view of the functional blocks of part of the software of FIG. 4.

In one form, the present invention resides in software running on the control computer 40, which software includes print monitor program 60, as represented in FIG. 4, with its basic functions represented in the table of FIG. 5. Print monitor program 60 would have overall control of receiving print jobs and directing them to printer apparatus 10 (FIGS. 1–3), as represented in step 61 (FIG. 5). During the operation of apparatus 10, print monitor program 60 receives or collects monitored system values from printer apparatus 10 and records those values in a database 62 along with a time of occurrence as represented in step 63. In this form, the time of occurrence can conveniently just be a time stamp of the creation of the database record.

Print monitor program 60 would further control initialization of an aggregate error handling program 64 in step 65. This initialization can be provided in accordance with any rational basis, and is preferably provided between print jobs run by print monitor program 60. This initialization may have any suitable basis, such as after each print job, after the production of a predetermined number of prints, or simply periodically.

Figure 6:
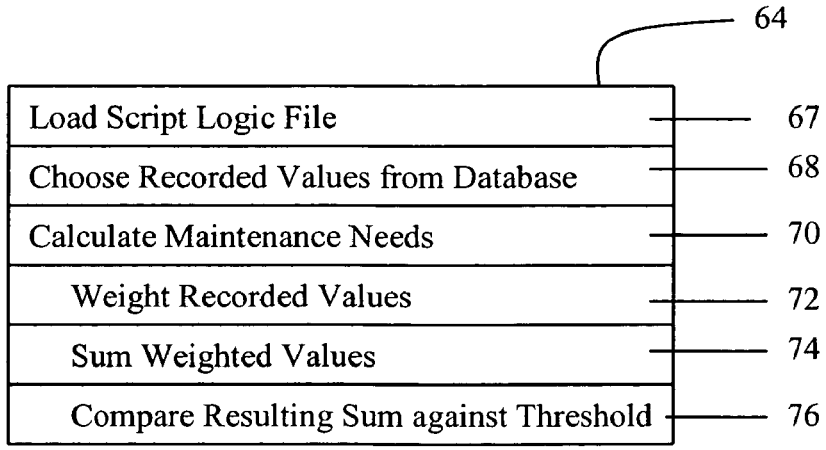
FIG. 6 s a table-format view of the functional blocks of another part of the software of FIG. 4.

The process of aggregate error handling program 64 is represented in the table of FIG. 6. Aggregate error handling program 64 generally loads an apparatus specific script logic file 66 in step 67, selects recorded values from database 62 in step 68 and uses the selected values to calculate the maintenance needs of apparatus 10 in step 70. In one embodiment, calculation step 70 involves the step 72 of weighting the various values according to either their respective types (print media tension, donor film tension, etc.) or according to their time of occurrence. The weighted values are summed together in step 74 and compared against a threshold value in step 76 to determine maintenance needs.

As mentioned, the values that are collected and recorded represent monitored system conditions. These values may have any suitable characteristics. They may take any suitable form, such as a single binary digit representing "1" or "0", a multi-digit value within any suitable range of values, or any other recordable value. The preferred form is a digitized representation which can be recorded and accessed via a database.

The values thus collected may originate from any suitable source, such as the on/off output of a single switch, or even an analog sensor coupled through an A/D converter. The actual values may represent a threshold determination such as that defined by a switch, or they may represent a variable value which can be subsequently compared to a threshold. Lastly, the actual values may be addressed as error conditions which need further attention, or further processing may be required to determine the significance of the recorded value.

In the context of the present example, it is likely that all of the recorded error readings will be within the critical operating parameters of apparatus 10 and thus be controlled by the functioning of control system 36. Aggregate error handling program 64 is designed to review the recorded values to determine maintenance needs before the occurrence of a critical error, which would terminate the operation of apparatus 10. In this manner, the real maintenance requirements of apparatus 10 can be better predicted, thus obviating the need for a more prophylactic amount of periodic maintenance, while maintaining performance quality. It should thus be understood that the term "error" in the present example is used to describe values or conditions which need attention for purposes of the present invention.

The aggregate error handling program 64 could be adapted to review all recorded values in database 62 and to either mark or otherwise collect values which need attention. Alternatively, such values can be marked when they are recorded in database 62. In the simplest form, digital output sensors can be used to provide the above-mentioned true or false sensor value, and an analog value being monitored can be built into the operating characteristics of such sensors so that the true or false output value of such sensor then simply becomes an erroneous value marker recorded in database 62. This erroneous value marker can then be used as the basis for selecting database entries for calculation. Alternatively, the use of logical "1" and "0" values obviates the need for separating erroneous values because a zero error value would contribute zero value to the calculation process.

As mentioned, the operation of aggregate error handling program 64 causes the various recorded values to be weighted in accordance with the type of sensor or in accordance with the time of occurrence of the recorded value. The values are also summed and compared against threshold values to determine maintenance needs. The specific arrangement of weighting and summing, along with the threshold values used, are dependent upon the electromechanical apparatus being monitored and the manner of monitoring that apparatus. This apparatus-specific arrangement may be programmed into aggregate error handling program 64 in the form of the apparatus-specific script logic file 66 used by aggregate error handling program 64.

Figure 7:
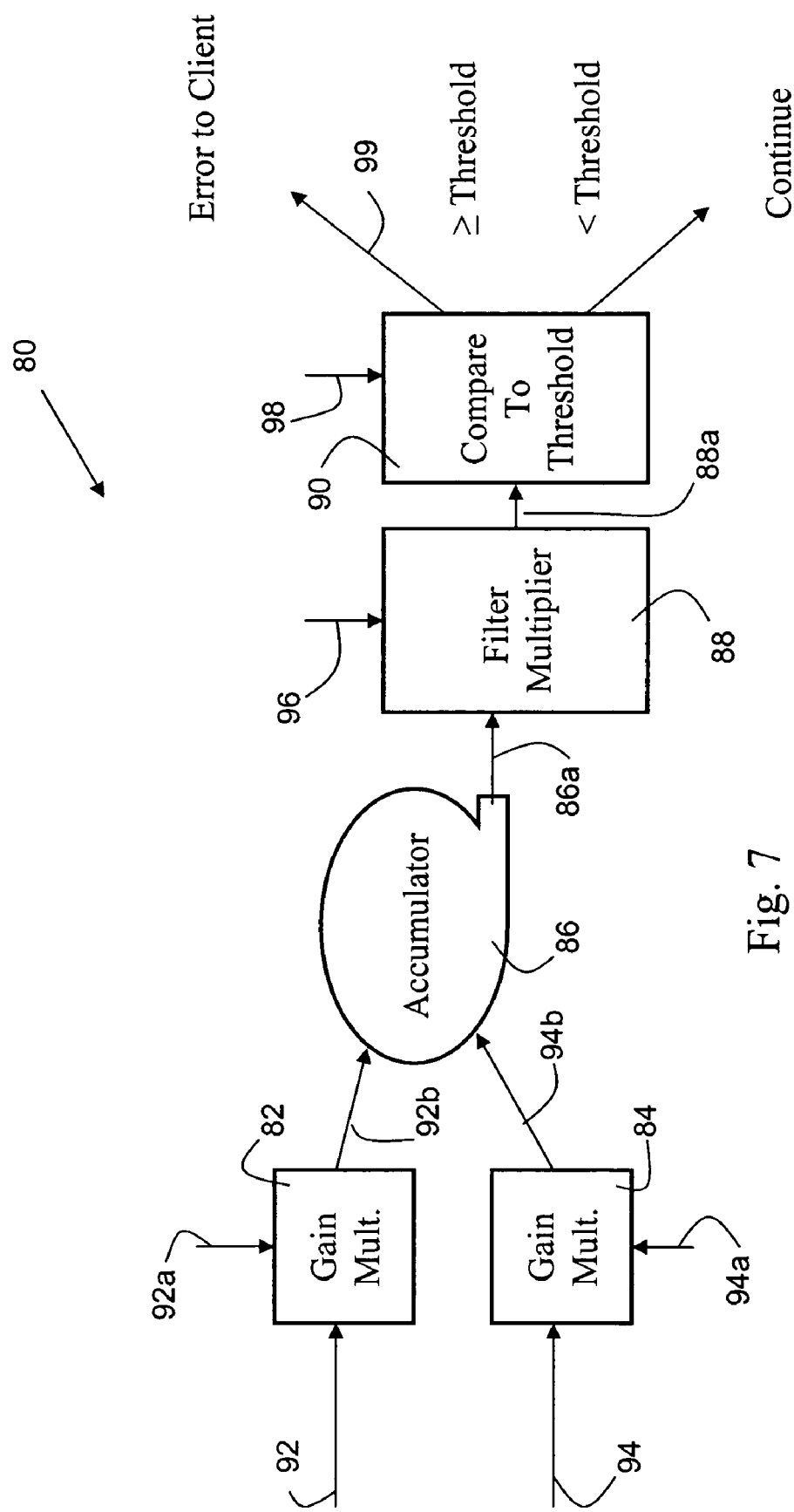
FIG. 7 is a schematic diagram of another embodiment of the present invention.

FIG. 7 is an example of a calculating process 80 which may be embodied in a script logic file 66 and used by error handling program 64 for calculating system maintenance needs. Generally included are one or more input gain multipliers 82, 84, an accumulator or adder 86, a filter multiplier 88, and a comparator 90. Multipliers 82, 84 are intended to receive separate recorded values 92, 94, respectively, from database 62 and to multiply those values by respective gains or weighting factors 92a, 94a, which are reflective of the types of values 92, 94. In other words, a tension value concerning print media 14 (FIG. 1) would be given a certain gain or weighting factor while a tension value from clear coat media 20a (FIG. 1) would be given a different gain or weighting factor.

The weighted values 92b, 94b are coupled to adder 86 where they are added or accumulated. Adder 86 may be constructed in various forms so that the weighted values to be accumulated and added together may be received either in parallel as shown in FIG. 7, or serially with multiple weighted values being received from the same multiplier 82, 84. In other words, calculating system 80 may be constructed with just a single input multiplier 82, and the values to be accumulated or added together may be serially fed through input multiplier 82 with the resulting weighted values being serially accumulated in adder 86. This serial approach is useful for processing database entries as suggested for the present embodiment. The output sum or value 86a of accumulator 86 may also be recorded in database 62 for future use.

Once adder 86 has received and accumulated a predetermined group of weighted input values, the accumulated error value 86a may be coupled to a filter multiplier 88, so that it can be weighted in accordance with the predetermined group of values. The use of filter multiplier 88 thereby allows a group of accumulated, weighted values to be filtered, or further weighted in an independent dimension, such as time. A respective weighting factor 96 for accumulated sum or value 86a is provided to multiplier 88 from script logic file 66.

The output 88a of filter multiplier 88 is then coupled to a comparator 90 which uses a predetermined threshold value 98 to determine system maintenance needs based upon the types of error values included in accumulated error value 86a. The respective threshold value 98 is provided to comparator 90 from script logic file 66. Alternatively to the use of filter multiplier 88, the threshold value used for comparison against the accumulated error value 86a may be factored or previously weighted for the predetermined group of error values, thereby reducing system calculation requirements.

When the compared error value 88*a* exceeds its predetermined threshold value, an output signal 99 is generated which can initiate a service call for apparatus 10. Alternatively, multiple calculating processes 80 may be dependently structured for achieving an error analysis methodology which is particularly suited to a specific apparatus. Thus, output signal 99 may be used as an input signal for subsequent calculating processes 80. In a similar approach, output signal 99 and sum or value 88*a* may both be recorded in database 62 for subsequent processing.

The time of occurrence of each recorded value is preferably used to give greater weight in the calculation process to recorded values which have occurred most recently. In this manner, a monitored system condition which is generating more and more error values will not be lost due to an averaging of recorded values. Any suitable time based weighting may be used. Where the time based weighting factor is applied to groups of values, as described in reference to FIG. 8, a basis is used for grouping time related values. In the context of printer apparatus 10, it might be desirable to examine the most recent 24 hours of printer operation and to break that period into four equal six hour segments for the purpose of applying a weighting factor based upon time of occurrence.

Figure 8:
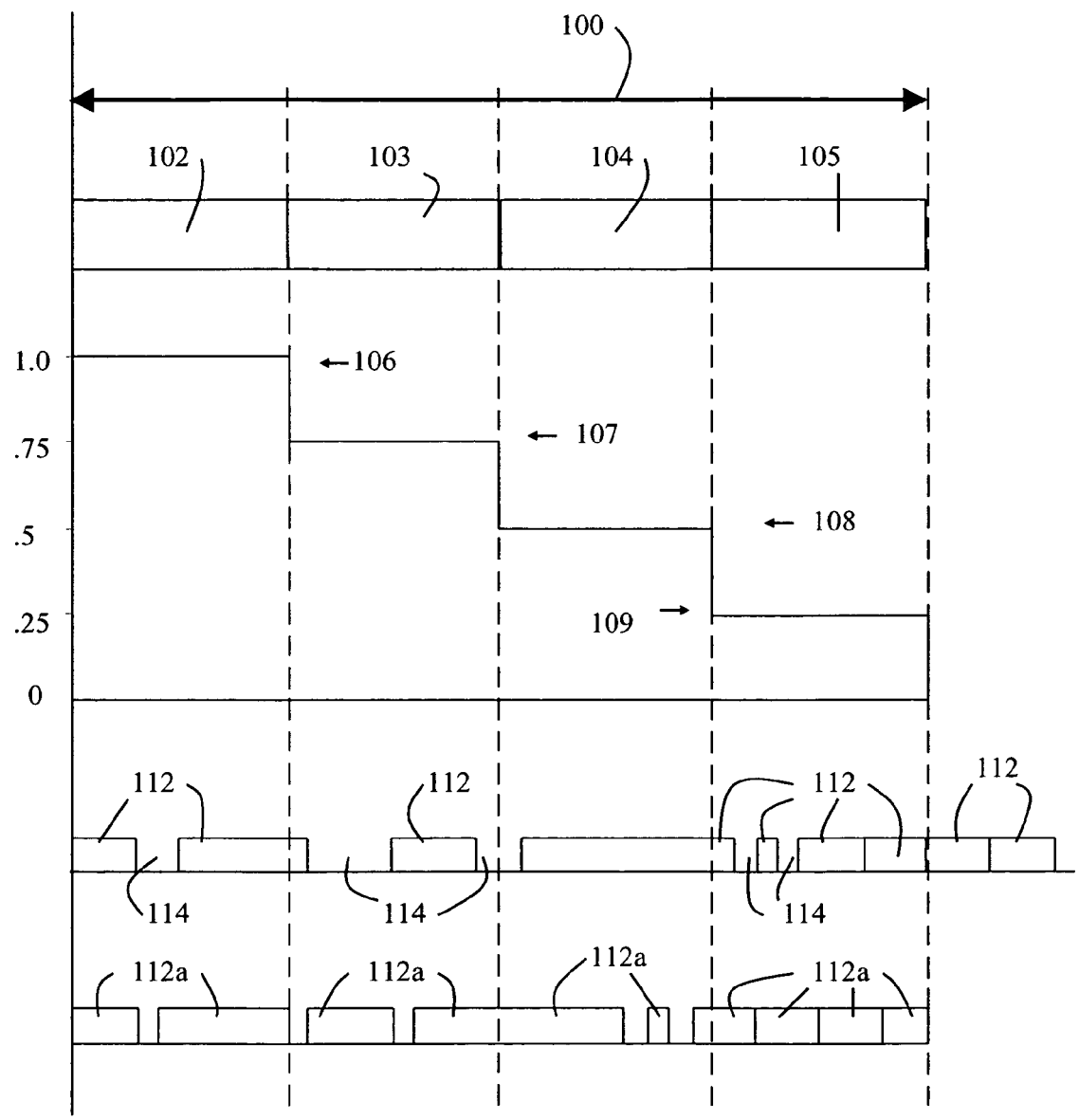
FIG. 8 is a time-based chart of functional aspects of the software of FIG. 4.

FIG. 8 shows a time chart depicting a review period 100 for analyzing recorded values. Review period 100 is broken into four equal segments 102–105, with segment 102 being the most recent, so that recorded values may be grouped in relation to those segments. Each segment 102–105 receives its own weighting factor 106–109, respectively, during of the calculation process.

In the grouping of values into segments 102–105, it may be preferable to ignore periods of inactivity of apparatus 10. To demonstrate this arrangement, actual print jobs 112 are charted by their actual time of performance. For purposes of calculation however, extended idle periods 114 are substantially ignored, and the recorded error values during those print jobs are assigned as jobs 112*a* to segments of 102–105, based upon apparatus operating time 116.

The calculation process of FIG. 7 has a great deal of flexibility in application to the present invention. Multipliers 82, 84 are described as applying weighting factors related to the monitored system condition of the respective recorded value, and filter multiplier 88 is described as weighting the accumulated sum or value 86*a* according to its time of occurrence. In this arrangement, aggregate error handling program 62 would group recorded values into segments 102–105 according to their time of occurrence so that the values having related times of occurrence would be summed together prior to filter multiplier 62. The accumulated sum or value 86*a* within a given segment 102–105 would then be weighted in filter multiplier 88 in accordance with the weighting factor 106–109 of the respective segment 102–105. This arrangement is useful for monitoring the overall system performance of different but related system conditions.

Alternatively, depending upon of the apparatus 10, it may be preferable to analyze the quality of performance of a single type of system condition. In this case, it would be preferable to group recorded values 92, 94 together based upon the same type of monitored condition and to use respective weighting factors 92*a*, 94*a*, which relate to time of occurrence. The resulting accumulated sum or value 86*a* would be evaluated based upon the respective type of monitored condition. The resulting accumulated sum or value 86*a* would indicate the quality of that single type of monitored system condition over time. This alternative calculating process may also be used in combination with the first described process to evaluate system performance from varying viewpoints.

It should be noted that the time weighting values 106–109 are not the only weighting method which may be used. In the application of evaluating the performance of a single type of monitored system condition, where each recorded value is first weighted according to its time of occurrence, a continuously varying time weighting factor, such as a linear function of time, may be used in place of the step values 106–109.

It should be noted that the processor shown in FIG. 7 may be duplicated and extended in any switchable manner. Thus, any of the described outputs 86*a*, 88*a*, 99 may be used as an input to a subsequent version of processor 80, either during a single activation of aggregated error handling program 64 or a different subsequent activation. In one example of this approach, an accumulated sum 86*a*, which is given a certain weighting factor 106–109 when it is first calculated, may be given a lower weighting factor 106–109 during a subsequent activation of error handling program 64.

The present invention is illustratively described above in reference to the disclosed embodiments. Various modifications and changes may be made to the disclosed embodiments by persons skilled in the art without departing from the scope of the present invention as defined in the appended claims.

What is claimed is:

1. A method for monitoring performance and determining the maintenance needs of an electromechanical system comprising the steps of:
   monitoring a plurality of predetermined system conditions;
   collecting monitored values of the plurality of said predetermined system conditions over time by steps including recording a plurality of monitored values representing each monitored predetermined system condition and the time of occurrence for each said recorded monitored value;
   calculating system maintenance needs from said collected monitored values by steps including comparing said collected monitored values representing a monitored system condition with a predetermined threshold value for said monitored system condition and determining whether a maintenance procedure is necessary to maintain the mechanical performance of said monitored system condition within predetermined limits; and
   where determined to be necessary initiating a maintenance procedure to maintain the mechanical performance of said monitored system condition within predetermined limits.

2. The method of claim 1, wherein said step of calculating includes the steps of:
   summing said recorded monitored values representing a monitored system condition; and
   comparing a resulting sum of said recorded monitored values representing a monitored system condition against said predetermined threshold value for said monitored system condition to determine whether a maintenance procedure is necessary to maintain the mechanical performance of said monitored system condition within predetermined limits.

3. The method of claim 2, wherein said step of summing uses said recorded monitored values in accordance with their respective time of occurrence.

4. The method of claim 3, wherein said step of summing includes weighting said recorded monitored values in accordance with their respective predetermined system condition.

5. The method of claim 3, wherein said step of comparing includes weighting either said resulting sum or said threshold value in accordance with said respective time of occurrence.

6. The method of claim 5, wherein said recorded monitored values having a more recent time of occurrence are given a higher weight than said recorded monitored values having a less recent time of occurrence.

7. The method of claim 2 wherein said step of summing uses said recorded monitored values in accordance with their respective predetermined system condition.

8. The method of claim 7, wherein said step of summing includes weighting said recorded monitored values in accordance with their respective time of occurrence.

9. The method of claim 7, wherein said step of comparing includes weighting either said resulting sum or said threshold value in accordance with said predetermined respective system condition.

10. The method of claim 2, wherein said step of summing uses said recorded monitored values which indicate an error in their respective monitored system condition.

11. The method of claim 2, wherein said step of calculating uses recorded monitored values from a predetermined amount of most recent operation of said electromechanical system.

12. The method of claim 11, wherein said step of calculating divides said predetermined amount of most recent operation into sequential segments and weights recorded monitored values from more recent segments higher than recorded monitored values from less recent segments.

13. The method of claim 12, wherein said step of calculating substantially excludes periods of inactivity of said electromechanical system from said predetermined amount of most recent operation.

14. A system for monitoring performance and determining the maintenance needs of an electromechanical system having a plurality of monitored system conditions, comprising:
  a recording apparatus adapted for collecting and recording over time, a plurality of monitored values for each of the plurality of monitored system conditions along with a time of occurrence for each recorded value;
  a calculating system adapted for calculating system maintenance needs from said plurality of recorded monitored values representing each monitored system condition and their respective time of occurrence; and
  an output signal generating system for initiating a maintenance procedure to maintain the mechanical performance of said monitored system within predetermined limits.

15. The system of claim 14, wherein said calculating system includes:
  an adder adapted for summing said recorded monitored values representing a monitored system condition; and
  a comparator adapted for comparing a resulting sum of said monitored values representing a monitored system condition from said adder against a predetermined threshold value to determine whether to generate an output signal to initiate a maintenance procedure.

16. The system of claim 15, wherein said recorded monitored values are selected in accordance with their respective times of occurrence, and further wherein said resulting sum or said threshold value is weighted in accordance with said respective time of occurrence.

17. The system of claim 16, further comprising a multiplier adapted for weighting said recorded monitored values in accordance with their respective system conditions prior to summing by said adder.

18. The system of claim 14, wherein the electromechanical system is a printing apparatus.

19. A system for determining maintenance needs of a printer apparatus having a plurality of monitored conditions, comprising:
  a recording process adapted for collecting and recording over time, a plurality of monitored values for each of the plurality of monitored conditions along with a time of occurrence for each recorded value;
  a calculating process adapted for using said plurality of recorded monitored values and the time of occurrence of said values for calculating system maintenance needs by steps including comparing said collected monitored values representing a monitored condition with a predetermined threshold value for said monitored condition and determining whether a maintenance procedure is necessary to maintain the mechanical performance of said monitored condition within predetermined limits; and
  an output signal generating process adapted to generate an output signal to initiate a maintenance procedure to maintain the mechanical performance of said monitored condition of said printing apparatus within predetermined limits.

20. The system of claim 19, wherein said calculating process includes:
  an adder process adapted for summing selected types of said recorded values; and
  a comparator process adapted for comparing a resulting sum from said adder process against a predetermined threshold value to determine maintenance needs of said printing apparatus.

21. The system of claim 20, wherein said recorded values are selected for said adder process in accordance with their respective times of occurrence, and further wherein said resulting sum or said threshold value is weighted in accordance with said respective time of occurrence.

22. The system of claim 21, further comprising a multiplier process adapted for weighting the selected recorded values in accordance with their respective monitored conditions prior to summing by said adder process.

23. The system of claim 20, wherein said recorded values are selected for said adder process in accordance with their respective monitored conditions, and further wherein said resulting sum or said threshold value is weighted in accordance with said respective monitored condition.

24. The system of claim 23, further comprising a multiplier process adapted for weighting the selected recorded values in accordance with their respective time of occurrence prior to summing by said adder process.

25. The system of claim 19, wherein said calculating process is adapted for using recorded values which indicate an error with their respective monitored conditions.

26. The system of claim 19, wherein said calculating process is adapted to use recorded values from a predetermined amount of most recent operation of said printing apparatus.

27. The system of claim 26, wherein said calculating process divides said predetermined amount of most recent operation of said printing apparatus into sequential segments and weights recorded values from more recent segments higher than recorded values from less recent segments.

28. The system of claim 27, wherein said calculating process substantially excludes periods of inactivity of said printing apparatus from said predetermined amount of most recent operation.

* * * * *